United States Patent

Greco et al.

(10) Patent No.: US 7,493,234 B2
(45) Date of Patent: Feb. 17, 2009

(54) MONITORING AND REPORTING NORMALIZED DEVICE SYSTEM PERFORMANCE

(75) Inventors: Paul M Greco, Tucson, AZ (US); Glen A Jaquette, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 270 days.

(21) Appl. No.: 11/126,911

(22) Filed: May 10, 2005

(65) Prior Publication Data

US 2006/0259274 A1 Nov. 16, 2006

(51) Int. Cl.
G06F 11/30 (2006.01)

(52) U.S. Cl. .................. 702/182; 702/186; 714/704; 714/718; 714/721; 369/53.2; 360/31

(58) Field of Classification Search ............. 702/182, 702/186; 714/704, 708, 718, 706, 705, 721; 369/53.2; 360/31, 53, 65
See application file for complete search history.

(56) References Cited

U.S. PATENT DOCUMENTS

| | | | |
|---|---|---|---|
| 3,704,363 A | 11/1972 | Salmassy et al. | |
| 5,031,124 A | 7/1991 | Bosinoff et al. | |
| 5,500,795 A | 3/1996 | Powers et al. | |
| 5,797,019 A | 8/1998 | Levine et al. | |
| 5,841,667 A | 11/1998 | Martin et al. | |
| 5,872,672 A | 2/1999 | Chliwnyj et al. | |
| 5,987,400 A * | 11/1999 | Hirano | 702/186 |
| 6,694,288 B2 | 2/2004 | Smocha et al. | |
| 6,697,976 B1 * | 2/2004 | Satoh et al. | 714/704 |
| 6,772,097 B1 | 8/2004 | Kromenaker et al. | |
| 7,240,250 B2 * | 7/2007 | Lea et al. | 714/704 |
| 2001/0044705 A1 | 11/2001 | Vardi et al. | |
| 2002/0135928 A1 * | 9/2002 | Aikawa et al. | 360/77.02 |
| 2003/0053236 A1 * | 3/2003 | Loh et al. | 360/31 |
| 2003/0074161 A1 | 4/2003 | Smocha et al. | |
| 2003/0115244 A1 | 6/2003 | Molloy et al. | |
| 2004/0030417 A1 * | 2/2004 | Gribble et al. | 700/29 |
| 2004/0054680 A1 | 3/2004 | Kelley et al. | |
| 2004/0093402 A1 | 5/2004 | Liu et al. | |
| 2005/0044451 A1 * | 2/2005 | Fry et al. | 714/38 |

FOREIGN PATENT DOCUMENTS

| | | | |
|---|---|---|---|
| EP | 0714063 A | 5/1996 | |
| EP | 1024432 A | 8/2000 | |
| WO | WO 03/009140 A | 1/2003 | |

OTHER PUBLICATIONS

R. Velex, et al., "An Inteliegent Tool For UNIX Performance Tuning"; Tools With Artificial Intelligence, 1993, TAI '93, Proceedings; Fifth International Conference on Boston, MA, USA Nov. 8-11, 1993, Los Alamitos, CA, USA, IEEE Comput. Soc. Nov. 8, 1993, pp. 118-122, CP010255426, ISBN: 0-8186-4200-9.

* cited by examiner

Primary Examiner—Carol S Tsai
(74) Attorney, Agent, or Firm—Dan Shifrin

(57) ABSTRACT

Methods are provided to monitor and report performance data of a device such as a data storage drive. A plurality of quantitative values are obtained from feedback and measurement mechanisms in a data storage device of a first model during operation of the storage device. The plurality of quantitative values are normalized. Then, one or more qualitative values are generated from one or more normalized quantitative values and evaluated against corresponding baseline performance values established for the first model.

10 Claims, 2 Drawing Sheets

MONITORING AND REPORTING NORMALIZED DEVICE SYSTEM PERFORMANCE

TECHNICAL FIELD

The present invention relates to monitoring and reporting performance parameters of a device in a data processing system.

BACKGROUND ART

In computer or data processing environments, it is desirable that all devices in the environment perform well. However, it may be very difficult to determine what "performing well" means for a particular device. Performance issues may be related to the device itself or to the ability of the attached system(s) to exploit device capabilities. Moreover, it may be very difficult to monitor performance and analyze various factors which might point to a degradation in performance. For example, in a data storage device, such as a tape drive, there are a large number of factors which can affect the performance of the device and many of them are not readily available to be analyzed.

Currently, analysis, if it is performed at all, is performed by an external system which may read very limited pieces of information and then create a statistical model of the device. However, the information typically provided by a device might not be sufficient to accurately determine device performance or related underlying causes for any unrealized performance. Moreover, the information used by the modeling system may not be consistent from one device to another of the same model or from one operating environment to another. Additionally, such a modeling system requires extensive tuning to be effective and there may not be a satisfactory method to validate the model.

Consequently, a need remains for a reliable, consistent and easy to use method to: determine the effective performance of a device, such as a tape drive; indicate degradation in performance and determine the cause of such degradation; and, identify any trends which might be useful as predictive failure indicators. It is further desirable that such a method be valid across a family of devices.

SUMMARY OF THE INVENTION

The present invention provides methods to monitor and report performance data of a device such as a data storage drive. The method includes obtaining a plurality of quantitative values from feedback and measurement mechanisms in a data storage device of a first model during operation of the storage device, normalizing the plurality of quantitative values, generating one or more qualitative values from one or more normalized quantitative values and evaluating the one or more qualitative values against corresponding baseline performance values established for the first model.

DETAILED DESCRIPTION OF THE PREFERRED EMBODIMENT

Figure 1:
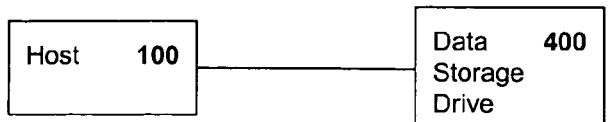
FIG. 1 is a block diagram of a data processing configuration of the present invention in which a data storage drive is attached to a host device.
Figure 2:
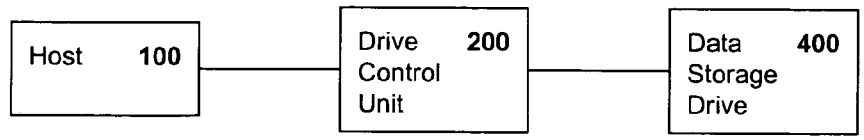
FIG. 2 is a block diagram of another data processing configuration of the present invention in which a data storage drive is attached through a drive control unit to a host device.
Figure 3:
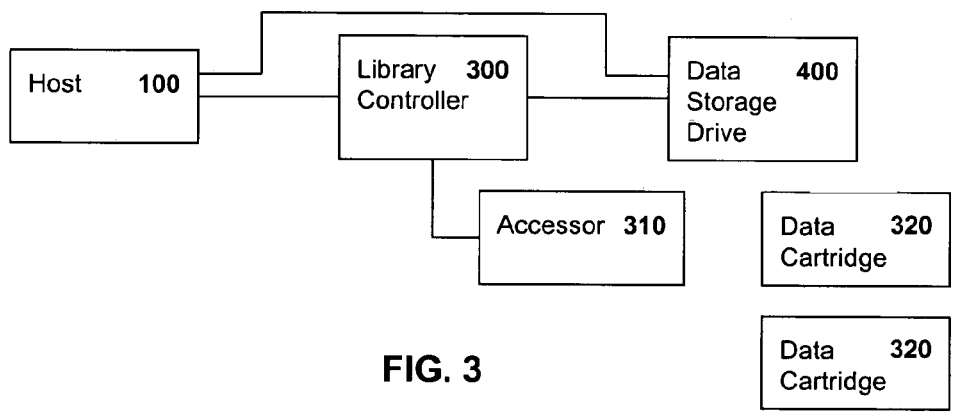
FIG. 3 is a block diagram of still another data processing configuration of the present invention in which a data storage drive is installed in a data storage library.

The present invention may be implemented in any of a number of data processing configurations. FIG. 1, for example illustrates one such configuration in which a data storage drive 400 is directly attached to a host device 100. FIG. 2 illustrates a second configuration in which the drive 400 is attached to the host device 100 through a drive control unit 200. And, FIG. 3 illustrates a third configuration in which the drive 400 is installed in an automated storage library. In this configuration, the drive 400 is attached to at least to the host 100 and to a library controller 300 which, in turn, may also be attached to the host 100. A mechanical accessor 310 transports data cartridges 320 between storage slots and the drive 400 under the direction of the library controller 300 when requested by the host 100. It is further possible that a drive control unit 200 or additional control units are present in the library configuration.

Figure 4:
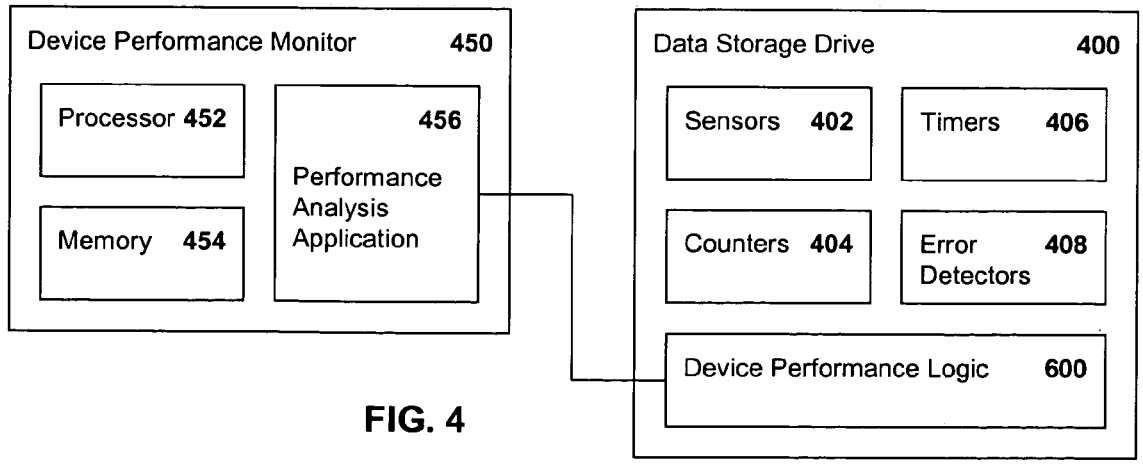
FIG. 4 is a block diagram of a data storage drive and a device performance monitor of the present invention.

FIG. 4 is a block diagram of the data storage drive 400 coupled through device performance logic 600 to a device performance monitor 450 which may be located in the host 100, the drive control unit 200, the library controller 300 or the data storage drive 400, depending on the data processing configuration. In addition to the device performance logic 600, the device performance monitor 450 includes a processor 452, a memory 454 for storing instructions executable by the processor 452 and a performance analysis application 456 which may be stored in the memory 454. The memory 454 may be any type of memory storage, such as RAM, hard disk or a combination of memory types.

Figure 5:
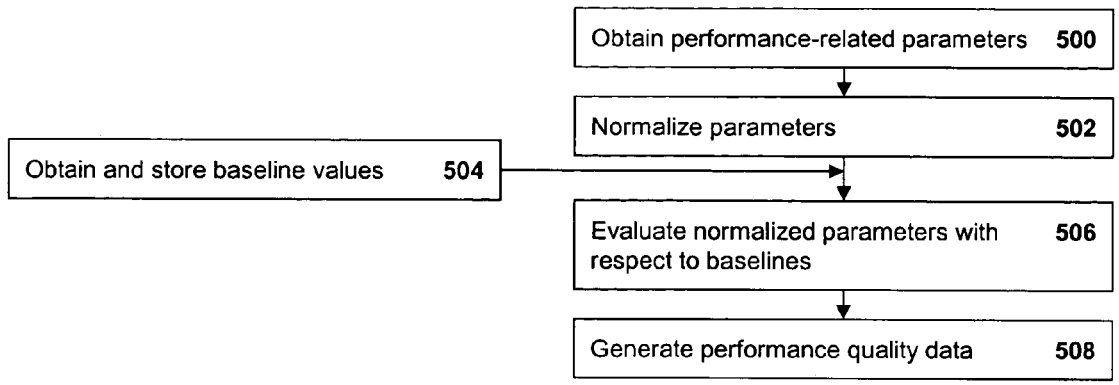
FIG. 5 is a flowchart of a method of the present invention.

Referring also to the flowchart of FIG. 5, various performance-related parameters are obtained in the device 400 from feedback and measurement mechanisms such as, but not limited to, sensors 402, counters 404, timers 406 and error detectors 408 (step 500). Such mechanisms are preferably chosen to have little or no impact on the performance or cost of the device. Thus, different devices may include different sets of mechanisms. The parameters may be grouped into a number of different categories. General, high level categories for a tape drive may include performance measurements (such as host and interface transfer rates, tape medium transfer rates and various drive usage and internal performance measurements) and capacity measurements (separately representing the current (static) state of the medium and its running (active) characteristics). More specific performance categories may include "device usage", "host commands", "host initiators", "host recovery by port", "mode phase timing windows", "media phase timing windows", "servo phase timing windows", "static capacity" and "active capacity". Additional or fewer categories may be used.

The parameters are preferably pre-processed by the device performance logic 600 in the drive 400 by normalizing the parameters to a device-specific standard (step 502). During normalization, parameters from the mechanisms 402, 404, 406 and 408 are scaled or adjusted to a set of values which are common to a type of device (such as a tape drive) and are also in a form (including being generated in units) which are largely consistent without respect to the underlying characteristics of the device. For example, the implications of a reduction in write speed of 2 MB/sec. may be different to a device which is capable of writing at 50 MB/sec. as opposed to a device which is capable of writing at 6 MB/sec. Thus, the absolute measurement of the write speed of a device may be normalized to percentages, representing a measure of the device's write rate performance. A reader of a report or an external analysis program may then compare the write rate performances of different devices without having to know the maximum write speed of any particular device.

In addition to normalizing to the specifications of the device, normalizing is also preferably performed with previous information for the same type of device, same or similar physical device, same type of medium and same or similar physical medium. The resulting baselines, representing what parameter values are "normal" for the particular system, are stored (step 504) and may be used to detect changes which may indicate current or possible future problems. Then, by evaluating different combinations of the normalized performance parameters (step 506), the device performance monitor 450 generates various measures of performance quality relative to baseline values which, either theoretically or historically, may be achieved by the drive 400 (step 508).

For example, a measure of the relative use of capacity (which is, a measure of one type of efficiency) may be obtained from parameters relating to the media and the channel (such as servo skips and CQ rewrites) and sync (such as dataset padding). More specifically, servo skips are areas of a tape which are not able to be tracked or reliably written to; these areas are skipped, leaving unused areas of tape and resulting in loss of capacity. A CQ rewrite occurs when a channel error prevents data from being read back immediately after being written (or from being read back with sufficient error correction margin). To reduce loss of data rate throughput performance, the tape is not stopped to re-write the data; rather, the data is re-written to another area of the tape, again resulting in a loss of capacity. And, dataset padding is a host-induced event in which the host synchronizes, forcing the storage drive to write all data to the medium at once, without buffering. Dataset padding results in a loss of format efficiency because a partially full dataset has unused space (padding) which is required by the format but not filled with user data.

As another example, data throughput (an evaluation of a different type of efficiency) may be obtained from parameters relating to the media, the channel, the host interface (such as host latency, error rates and link quality), sync (such as dataset padding and backhitch), the buffer (such as whether it is "starved" or "choked"), speed matching (how closely the streaming rate of the drive 400 matches the data rate of the host 100), the host channel quality, the effective host data rate, data compressibility and error recovery procedures (EPRs).

As a still further example, command usage may be evaluated from parameters relating to load time (which may be broken into the times for the various load phases), unload time (which may also be broken in phases), read, write, other (such as locate, space and rewind), idle time, and time waiting for removal of a cartridge. As will be appreciated, additional or fewer parameters may be used to determine the preceding or additional efficiencies and performance characteristics.

Figure 6:
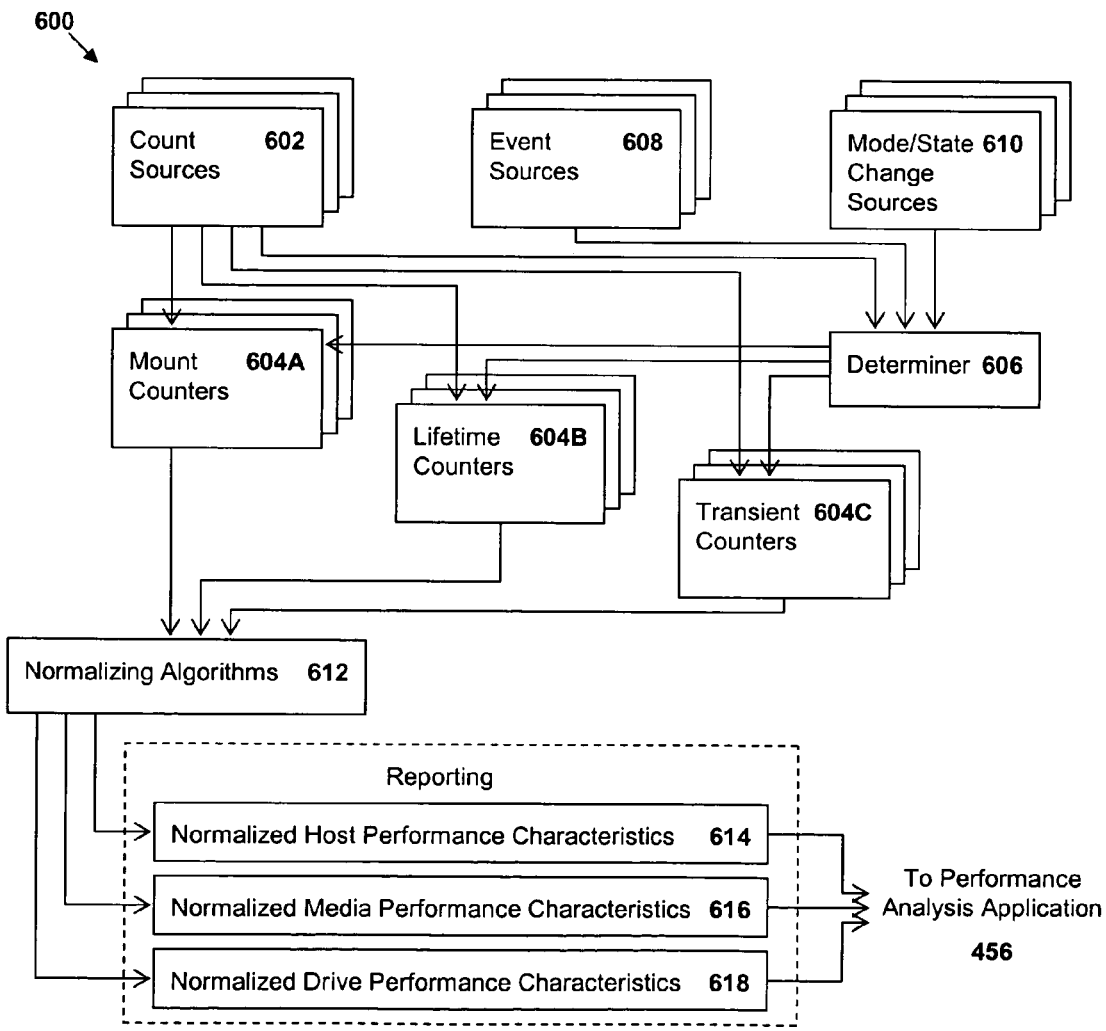
FIG. 6 is a functional diagram of device performance logic of the present invention.

FIG. 6 is a functional diagram of device performance logic 600 of the present invention. Count sources 602 represent the feedback and measurement mechanisms 402, 404, 406 and 408 which provide information to the logic 600. It may be useful to evaluate information across different reporting cycles. Consequently, three sets of counters may be provided. Counters in a first set 604A retain values across the entire time a cartridge is mounted in the drive (mount time). These values will be discarded before the next cartridge is mounted and are useful for, among others, evaluating statistics during the processing of a particular data cartridge (medium) 320. A second set of counters 604B have a lifetime reporting cycle with values being discarded when the system is powered off or reset. Data generated from the lifetime counters 604B are particularly useful for very high level reporting on the condition of the device. A third set of counters, transient counters 604C, provides a reporting cycle defined by a user with the values being discarded upon some predefined condition being met, such as upon request by the controlling device 100, 200 or 300 or upon a data read. Additionally, a request may be used to manage a dynamic specific operational window of interest during which performance data can be monitored and reported.

A determiner 606 receives information from event sources 608 and mode/state change sources 610 and performs counter resolution logic to drive or manage the counters 604. For example, the determiner 606 allows synchronization of multiple counters in different sets 604A, 604B and 604C which have different update cycles. Calculations involving more than one counter will thus have computational integrity. Because various counters may receive information from the same underlying count source(s) 602 or event source(s) 608 but be differentiated by a mode or device state, the determiner 606 is programmed to trigger or update the appropriate counters upon mode or state changes, as received from the mode/state change sources 610. Such modes and states may include, but are not limited to, the ready state of the device, the media mode (read, write, etc.) and the buffer state (setup, ready, paused, etc.). Logic within the determiner 606 may also coordinate the triggering or resetting of a counter which depends on another counter, such as for example, an error which occurs without a buffer pause.

The normalized performance characteristics 614, 616 and 618 are sent to the device performance monitor 450. Algorithms provided by the performance analysis application 456 and executed by the processor 452 of the device performance monitor 450 perform calculations on the normalized performance characteristics 614, 616 and 618 from at least the drive 400 as well as possibly from other drives to determine and isolate the desired aspects of performance across the overall system and its various component devices. Such calculations may provide measures of efficiency, performance and capacity. Measures of efficiency are preferably in terms of a previously calculated baseline. Measures of performance may measure losses of opportunity, which occur when an event takes an unexpected amount of time, as well as direct losses, which affect performance and occur while a drive is paused or a command is active. Measures of capacity may be static, containing information about the current state of data recorded on the medium and which may be related to other devices and/or preexisting data on the medium, or may be active, containing information about the continuing write characteristics of a particular drive/medium combination. Calculation of the static capacity may include linearizing the medium into a logically continuous distance, locating existing end of data positions on the medium on the same scale, and using interpolation to provide the capacity. Calculation of the active capacity may include performing the same calculation but using the amount of data processed rather than the amount of data on the medium.

Reported measurements may be quantitative, typically provided as a percentage of a baseline value, as well as qualitative, typically provided as a value within a range of values (such as 0 to 255). Moreover, different levels of reported measurements may provide information intended for different people or purposes. For example, level I measures are course measures of system throughput and usage and are intended to provide a high level view of the overall performance of the system. Level II measures are more detailed customer oriented measures to allow a system administrator to adjust or tune different aspects of a system to increase throughput and efficiency. Level III measures are more detailed still and are intended to allow developers to assist a system administrator in addressing performance issues; they are preferably provided in internal log pages available only to a developer. Thus, the present invention indicates causative effects, that is, reasons why the qualitative measure may fall short of the optimal value for the particular model of drive. As an example, not only will the present invention indicate the existence of a host or device bottleneck, the present invention will also indicate the causes of such a bottleneck. Furthermore, quantitative data may be sent to an external application to perform statistical and trend analysis and predict possible future failures. A few examples of possible reported measurements include:

General health:
Host interface, drive and media "health checks" provide overall measures of the condition of the host interface, the drive and the media, respectively, level II, on a scale of 0-255;

Device Usage:
Total load time of last media cartridge, level I, in seconds;
Load time to ready, level I, in seconds;
Medium accessible/ready time, level I, in seconds;
Repositioning command count, level III, an actual count;
Repositioning command time, level III, in milliseconds;
Read (or write) command count, level III, an actual count;
Read (or write) command time, level III, in milliseconds;
Read (or write) time, level I, a percentage of the total medium accessible/ready time;

Timing Windows:
Total write cycle, level I, an actual count;
Total write cycle time, level I, in milliseconds;
Host data transfer time, level II, a percentage of time total write cycle time averaged across all write cycles;

Host Interface Throughput Measurements:
Host write transfer amount, level I, in megabytes;
Write commands processed, level I, an actual count;
Host data transfer time write data rate, level I, in megabytes per second;
Write efficiency at interface, level II, a percentage of the average host data transfer time write data rate;

Drive Throughput Measurements:
Average host side buffer transfer rate, level I, in megabytes per second;
Host side buffer transfer utilization, level II, a percentage of the drive's maximum native data rate;
Average medium side buffer transfer rate, level III, in megabytes per second;

Media Capacity Measurements:
Actual medium space consumed, level I, a percentage of total space available;
Medium space lost, level II, a percentage of the actual medium space consumed.

Additionally, other measurements, referred to as "detractors", may provide a more direct indication of performance which is less than that indicated by the baseline:

Device Usage:
Load/unload/repositioning time retry events, level I, an actual count;
Load/unload/repositioning time retry event impact, level II, a percentage of the load/unload/repositioning time to ready time;

Host Interface Throughput Measurements:
Host interface data flow characteristic, level II, a value from 0-255;
Link quality, level II, a value from 0-255;

Drive Throughput Measurements:
Host hold events, level I, an actual count;
Host hold events impact, level II, a percentage;
Host initiated synchronization events, level I, an actual count;
Host initiated events impact, level II, a percentage;
Calibration events while writing, level III, an actual count;
On-the-fly correction while writing, level III, a percentage of compressed bytes transferred;

Media Capacity Measurements:
Capacity loss due to synchronize events, level III, in megabytes;
Capacity loss due to synchronize events, level II, a percentage of the medium lost;
Capacity loss due to on-the-fly error, level III, a percentage of the medium lost.

It will be appreciated that the above measurements are merely representative of possible measurements which may be provided by the present invention and are not intended to be limiting.

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. For example, although the description herein of the data storage device 400 is primarily in terms of a magnetic tape drive, the present invention is not limited to use with a tape drive but may be employed with any other type of data storage device. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring and reporting performance data of a data storage device, comprising:
obtaining a plurality of quantitative values from feedback and measurement mechanisms in a data storage device of a first model during operation of data storage device;
normalizing the quantitative values to device-specific standards for the data storage device by scaling the quantitative values to a set of values which are common to the data storage device and adjusted to a form which is consistent across different data storage devices;
generating one or more qualitative values from one or more normalized quantitative values; and evaluating the one or more qualitative values against corresponding baseline performance values established for the first model.

2. The method of claim 1, wherein evaluating qualitative values comprises determining how closely to the baseline performance values the data storage device is operating.

3. The method of claim 2, further comprising determining if performance of the data storage device is improvable.

4. The method of claim 2, further comprising associating causative effects to the qualitative values if performance of the data storage device is less than the baseline values.

5. The method of claim 1 wherein obtaining the plurality of quantitative values comprises accumulating the plurality of quantitative values until the data storage device is reset.

6. The method of claim 1 wherein obtaining the plurality of quantitative values comprises accumulating the plurality of quantitative values until a data media currently mounted in the data storage device is unmounted.

7. The method of claim 1 wherein obtaining the plurality of quantitative values comprises accumulating the plurality of quantitative values until a predetermined condition occurs.

8. The method of claim 1, wherein the feedback and control mechanisms comprise at least one of sensors, counters, timers and error detectors.

9. The method of claim 1, further comprising categorizing each qualitative value into one of a plurality of levels according to the purpose for which the value is intended.

10. The method of claim 9, wherein the plurality of levels comprise:
- a first level of values of system throughput and usage to provide a high level view of the overall performance of the data storage device;
- a second level of values, more detailed than those of the first level, to allow a system administrator to adjust aspects of the data storage device to increase throughput and efficiency; and
- a third level of values, more detailed than those of the second level, to allow developers to assist a system administrator in addressing performance issues of the data storage devices.

* * * * *